Figure 1:
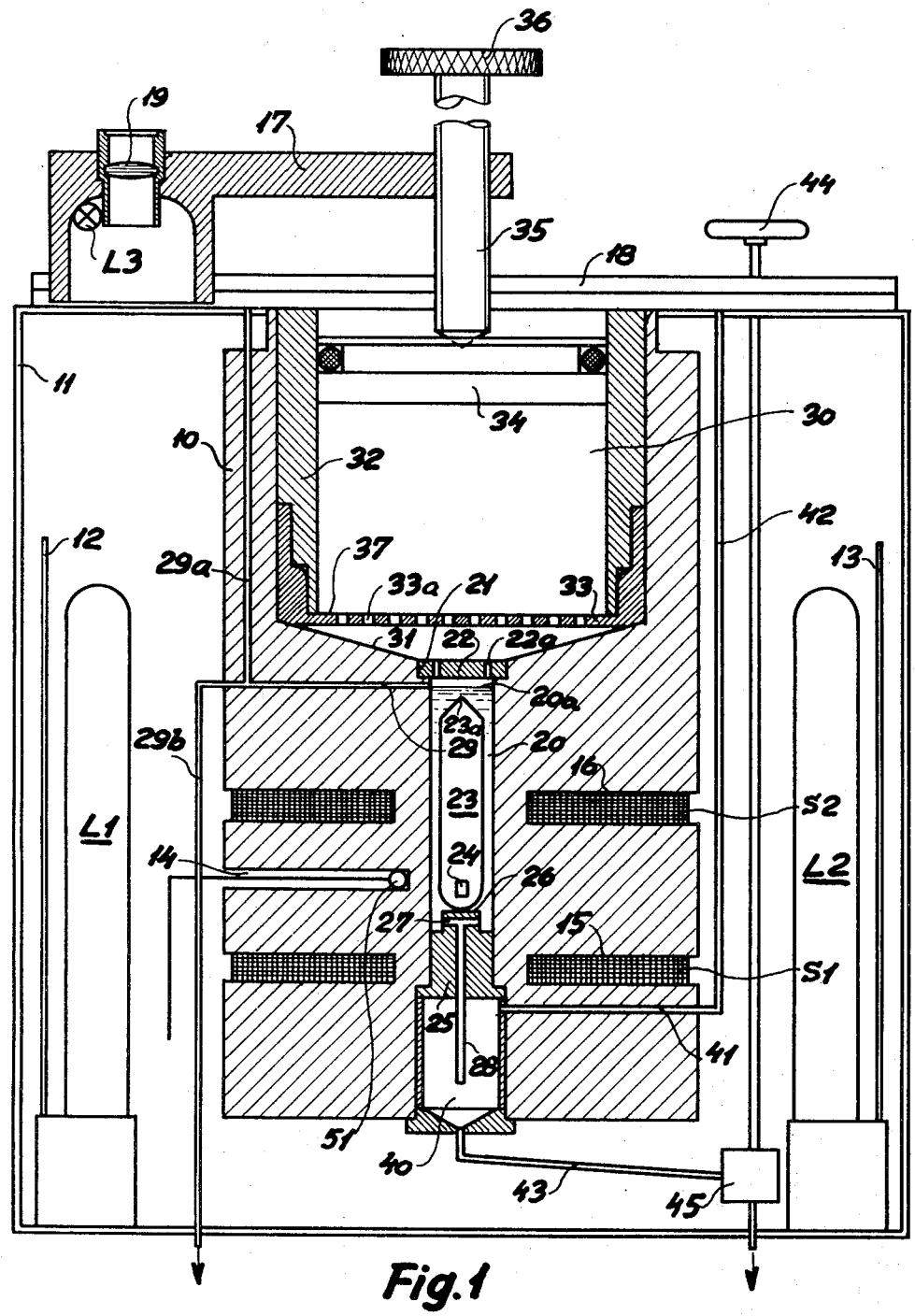

United States Patent [19]
Aegidius

[11] 3,815,424
[45] June 11, 1974

[54] APPARATUS FOR FILTERING AND DENSITY DETERMINATION OF A LIQUID

[75] Inventor: Poul Erik Aegidius, Hillerod, Denmark

[73] Assignee: N.K. Verwaltungs AG, Zug, Switzerland

[22] Filed: Mar. 8, 1972

[21] Appl. No.: 232,719

[30] Foreign Application Priority Data
Mar. 9, 1971 Denmark .................. 1082/71

[52] U.S. Cl. .................. 73/453
[51] Int. Cl. .................. G01n 9/14
[58] Field of Search ....... 73/32, 452, 453; 23/230 R

[56] References Cited
UNITED STATES PATENTS
1,907,103  5/1933  Harris .................. 23/230
2,992,561  7/1961  Burt, Jr. .................. 73/453
3,173,289  3/1965  Davis .................. 73/17
3,407,666  10/1968  Glassy .................. 73/453

Primary Examiner—Herbert Goldstein
Attorney, Agent, or Firm—Ladas, Parry, Von Gehr, Goldsmith & Deschamps

[57] ABSTRACT

An apparatus for filtering and density determination of a liquid, particularly of fat extracted by wet grinding in a solvent, and of the type having a magnetically actuated float movable within a chamber, characterized in that the float chamber (20) and a filter (32–34) connected thereabove are enclosed in a substantially massive metal body or metal block (10) provided with thermostatic control.

12 Claims, 3 Drawing Figures

APPARATUS FOR FILTERING AND DENSITY DETERMINATION OF A LIQUID

This invention relates to an apparatus for the filtering and density determination of a liquid, particularly of fat extracted by wet grinding in a solvent, and of the type having a magnetically actuated float movable within a chamber.

Such an apparatus is particularly useful in the determination of the fat or oil content in substances of vegetable or animal origin, such as beans, grain, seed, nuts, meat products, foodstuffs and feeding stuffs.

The fat content of a substance can be determined analytically by contacting a suitably ground, weighed amount of the material with a fat extraction agent, for instance ether or petrolether, while the material is enclosed in filter paper so that the particles thereof will not be mixed with the extraction agent. After a certain time practically all the fat of the sample will be extracted into the liquid, whereafter the liquid may be inspissated and the amount of fat weighed. The fat percentage of the sample can then easily be determined. The extraction time depends on the fineness of grinding, the nature of the material and the employed extraction apparatus. Literature on the subject mentions extraction times of from 2 to 24 hours for obtaining complete extraction. The method is often referred to as Soxhlet's Method, named after a much used extraction apparatus.

The Soxhlet method is used as standard method in fat determination and in various countries regulations have been made for the performance of the method in detail (the grinding and weighing of the sample, the construction and operation of the extraction apparatus, inspissation etc.). The rules may vary from one country to another and from material to material. But in any case the standard method is very slow and labour-consuming, and the results are not always quite correct because there are several sources of error such as for instance imcomplete extraction, extraction of other substances than the fat, evaporation of volatile fatty acids and essential oils, which evade detection.

In trading with and processing foodstuffs and feeding stuffs the standard method is inconvenient on account of the long time and the many working operations required in the analysis. There has therefore long been a need for a much faster and easier method of fat determination. In the course of time experiments have resulted in a considerable number of fast methods and apparatus for fat determination and the problem has been an object of lively research activities, which will be seen i.a. from an abundant literature on the subject. The previously employed methods and apparatus suffered from various drawbacks, in particularly lacking accuracy and handiness, and although some of them might give satisfaction in guiding measurements, no country has so far approved any fast measuring apparatus as replacement for the standard method for commercial use in connection with the said fatty substances. In many countries producers have wished prices to be fixed according to the fat content of the products, but very few countries have adopted obligatory pricing of for instance soybeans, groundnuts etc. on basis of fat content, chiefly on account of lacking apparatus for rapid and reliable fat determination. In countries where pricing on basis of fat content has been adopted or where a certain fat content shall be guaranteed, for instance in mixed feed, the standard method has been applied, but, as already said, it is both time and labour consuming.

In the rapid methods — as in the standard method — it is normal practice to use an extraction liquid for extracting the fat. The so-called wet-grinding procedure is often used, and then a weighed amount of unground material, for instance soybeans, groundnuts, rapeseed or the like, is treated in a so-called Waring Blender together with a measured volume of extraction liquid. The Waring Blender consists of a chamber in which a plurality of steel knives rotate at high speed, whereby the material is divided finely and mixed with the extraction liquid. In this manner the extraction time may be reduced to a few minutes. After extraction the contents are filtered in the chamber, and on the clear filtrate a physical property, such as dielectricity constant, refraction index or density, which depends on the fat concentration in the filtrate, is then measured. When knowing the weighed amount of material and the volume of extraction liquid the fat percentage of the sample may be calculated on basis of the said measurement. If using constantly the same amount of material and the same volume of extraction liquid, the fat percentage in the filtrate will be proportional to the fat percentage to be measured. The relation between the measured physical property in the filtrate and the actual fat percentage in the material is generally determined experimentally by measuring a series of samples analysed by the standard method.

It is the object of the present invention to provide an apparatus that can be used in the density method and which gives practically the same accuracy as the standard method, but where the measuring time per sample is only about 3–4 minutes. It is a further object to provide an apparatus that can be operated by a non-skilled staff and involves fewer sources of error than the apparatus used in the standard method.

A known form of the density method is carried out as follows (for instance with the French "Oleometre"):

A weighed sample, for instance 50 grams, is treated in a Waring Blender together with for instance 100 ml of orthodichlorobenzine. When all fat has been extracted, the liquid is filtered under pressure and the density of the filtrale is determined by a hydrometer. The temperature of the filtrate is measured and correction made for the influence of the temperature on the density. By means of a conversion table the desired fat percentage of the sample is calculated from the temperature-adjusted density. The table is drawn up empirically on basis of standard analyses of the said material.

The density of the fat is rather constant, namely 0.92, while the density of orthodichlorobenzine is about 1.31. Consequently, the density of the filtrate after complete extraction will depend on the amount of fat contained in the sample.

In literature the density method is mostly referred to as a "not quite accurate" method for fat determination. The tests carried out with the French "Oleometre" also resulted in relatively great deviations from the actual fat percentages ascertained by the standard method.

In the density method as carried out with the Oleometre there are several serious sources of error:

a. The extraction in the Waring Blender does not proceed under ideal conditions. The blender mainly treats the liquid particles, while the material particles are finely divided by cutting and impact effect. Consequently the temperature increase in the liquid will be relatively great, which in turn results in an uncontrollable evaporation of the extraction liquid. Moreover, the steel knives in the blender will gradually get blunt, and this, too will affect the measuring result in that the reaction within the given period of time will no longer be complete.

b. On account of the hydrometer a large amount of filtrate is required (at least 50 ml), and the filtration therefore takes a long time, even if carried out under pressure. Particularly the last stage of the filtration, when the solids concentration in the extraction liquid is great because much of the liquid has been filtered off, proceeds very slowly. During the long filtering time also some evaporation of the extraction agent may occur, which in turn affects the final measuring result. Owing to the long filtering time the measuring time in the Oleometre is reckoned to be about 15 minutes for the first sample and about 10–12 minutes for each of the following samples. This waiting time may be very inconvenient in the processing of and trade in foods and feeding stuffs.

c. The various fats vary slightly in density, rapeseed for instance has a density of 0.908, whereas it is 0.919 for soybeans. It is possible, of course, to use a conversion table which is adapted to give the best possible readings for each material and thus correct the densities of the different materials, but also within the same group of materials greater or smaller variations of density may occur. The density of rapeseed oil, for instance, may vary within a range of 0.906–0.910, and for other materials the variations may be considerably greater. It is obvious that the greater the density of the extraction agent relatively to that of the fat, the less will the variations in the fat density influence the final results. There are extraction liquids, for instance tetrachloroethylene, which have a higher density that orthodichlorobenzine, but often their boiling point is lower, whereby the evaporation error during grinding and filtration will be too great, and the French system as applied in the Oleometre therefore cannot be used. The density of tetrachloroethylene is 1.62 whereas for orthodichlorobenzine it is 1.31, so that it would be an advantage to use the former rather that the latter.

d. Density determination by means of a hydrometer involves various drawbacks:

1. The large amount of filtrate required has already been mentioned.
2. The recording of the hydrometer is affected by the surface tension of the liquid, which in turn depends on the fat concentration and temperature.
3. A hydrometer cannot cover the whole of the desired measuring range (0–60% of fat). It will be necessary to have three or more hydrometers with different scales and adjustment. It is difficult to achieve the required accuracy and linearity with these hydrometers. The extreme points of the scales must register exactly.
4. The hydrometer is inconvenient in operation. All during operation it must be ensured that the hydrometer does not contact the inner surface of the chamber which contains the filtrate, because the friction caused thereby would affect the reading. The hydrometer is difficult to read since the attention must be given to the adhesion of the liquid surface to the stem (the liquid "climbs" up the stem on account of surface tension). The hydrometer must be wiped carefully after each reading to avoid transfer errors from one sample to another.
5. The reading on the hydrometer has to be corrected to account for the temperature of the filtrate, which must be measured with an accuracy of 0.1° C. The temperature correction depends on the fat concentration in the filtrate, in that the extraction liquid and the fat have different temperature coefficients.
6. It is inconvenient to work with a conversion table for each material. It is quite a great task to prepare these conversion tables from standard analyses. There are several hundred different vegetable and animal substances, when calculating all the employed mixtures of pure and processed materials used in the food and feeding stuff industries.
7. The hydrometer having a fixed scale which cannot be changed, the extraction liquid must necessarily always have the same density within a margin of about 1 on the fourth decimal of the density. This requirement is very difficult to honor unless a completely pure extraction liquid is used, and such a liquid is very expensive.

The conclusion that must be drawn from the above 7 items is that for use in fat determination by the density method the hydrometer is both inconvenient and inaccurate.

The known art further comprises apparatus for magnetic density determination, cf. for instance James P. Senter: Magnetic Densimeter Utilizing Optical Sensing, Review of Scientific Instruments, February 1969, pages 334–338. The known apparatus of this type, however, are difficult to handle, partly on account of the slow and sluggish movements of the float in a uniform magnetic field or the risk of contact between the float and the housing containing the liquid under examination, partly because the requirements of calibration owing to variations in float volume and weight are particularly great, and because the stabilization of the current to the magnet coil must be very accurate.

The known densimeters cannot be used in unclear liquids without a complex servo control of the float by means of sensing coils adjacent to the float magnet. The known densimeters operate with conventional liquid thermostat, which makes the apparatus considerably more complex.

The known densimeters have never been capable of measuring small amounts of liquid without a very complicated cleansing of the apparatus between the tests.

The apparatus according to the invention is characteristic in that the float chamber and a filter connected thereabove are enclosed in a substantially massive metal body or metal block provided with thermostatic control. As a result the temperature in the float chamber can be kept constant within very narrow limits, and the filtrate from the filter will rapidly assume the same temperature. Evaporation losses from the filtrate are limited to a minimum, and both filtering and measuring can be performed in a practically closed system.

Figure 2:
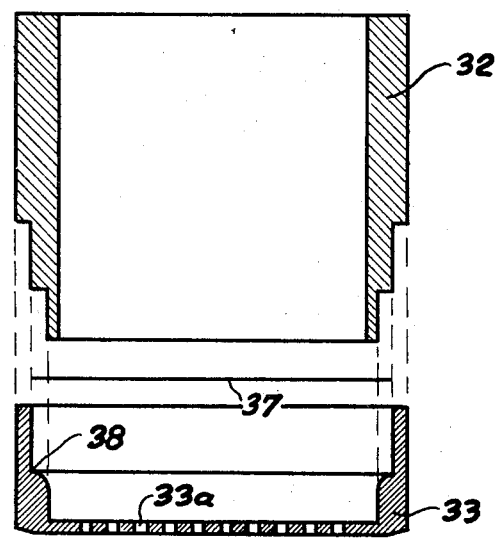
Figure 3:
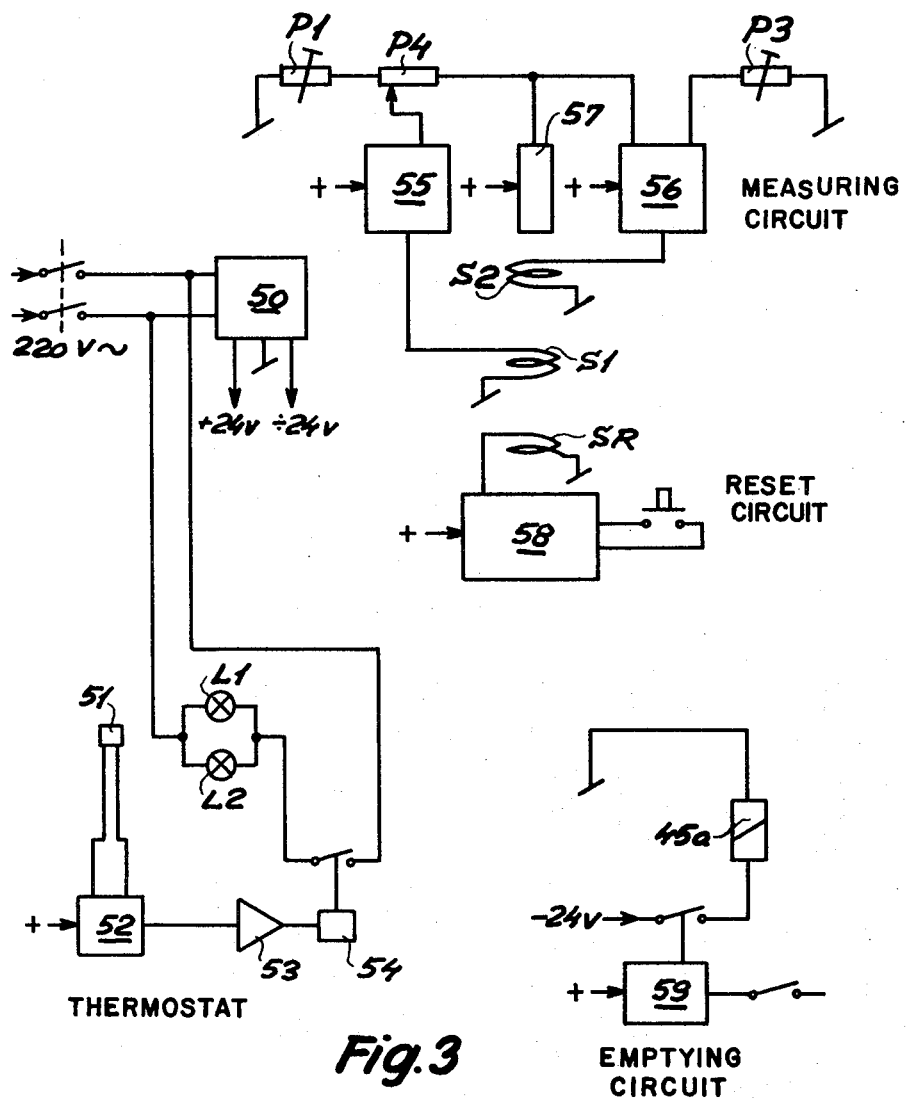

The invention will be explained in greater detail below by the specification of a preferred embodiment and with reference to the drawing, in which;

FIG. 1 presents a somewhat schematic section through an apparatus according to the invention, FIG. 2 is a section through the filter used in the apparatus with the parts drawn apart, and FIG. 3 is a block diagram of the electric circuits of the apparatus.

The apparatus illustrated in FIG. 1 comprises a cylindrical aluminium block 10 containing a float chamber 20, a filter chamber 30 and a flushing chamber 40. The block 10 is mounted in a housing 11, one side wall of which is made from perforated plate to ensure proper ventilation. The block 10 is heated by radiation from two lamps L1 and L2 mounted within the housing and reflectors 12 and 13 behind the lamps. In a radial channel 14 in the block is mounted a thermistor controlling in known manner via a bridge coupling 52, FIG. 3, an amplifier 53 and a relay 54, the feeding of current to the lamps L1 and L2 so that the temperature of the block is maintained constant. The block has been turned black by an Eloxy process to increase radiation. This has been found expedient for obtaining an accurate temperature control.

The use of lamps for heating obviates the problems of afterheat known from other types of heating elements. The thermistor channel 14 is in actual practice disposed perpendicular to a plane through the lamps, though in FIG. 1 it is shown in the same plane as the lamps for the sake of clearness. The thermistor is disposed right at the inner end of the channel adjacent to the float chamber where the most constant temperature is required.

By means of a thermostat control like this a very high degree of accuracy is obtained in a simple and cheap manner. The temperature can be maintained constant within a range of 0.03–0.05° C, which is fully adequate for the purpose.

In the upper portion of the block 10 is the cylindrical filter chamber 30, which is open at the top while the bottom is formed as a flat funnel 31 leading to float chamber 20. At the top of the float chamber an acrylic disc 22 provided with flow holes 22a along the edge is inserted in a recess 21.

In the filter chamber may be inserted a filter housing, see FIG. 2, consisting of a cylinder 32 of a plastics material, for instance Delrin, and a perforated plate 33, for instance of aluminium. This plate serves as support for a paper filter disc 37 and has a plurality of holes 33a of a size that ensures an effective filter area of suitable size and safe support for the paper. The perforated plate has an upstanding edge with an internal recess 38 in which a paper filter disc is inserted. The cylinder 32 is then pressed against the perforated plate 33, guided by means of the approximately 12 mm high edge of the perforated plate.

When the cylinder is pressed into position the outer edge of the paper disc is folded to provide a proper seal, while the rest of the disc is in plane engagement with the perforated surface. A removable plunger 34 with a sealing O-ring fits in the cylinder 32 and can be pressed downwards therein as will be described later.

The float chamber 20 is an axial bore in the block 20, for instance of a diameter of 12 mm. In the float chamber is a hollow glass float 23 terminating at the top in a cusp 23a and containing a small permanent magnet 24. This magnet is actuated, as will be explained later, by the magnetic field from two coils S1 and S2 wound in grooves 15 and 16 in the block 10, one below and one above the magnet 24.

A plug 25 at the bottom of the float chamber has a plane upper surface 26 on which the float can rest. Below this surface is a transverse channel 27 communicating with a narrow discharge tube 28. Below the acrylic plate 22 is an overflow pipe 29 connected to air duct 29a and a discharge pipe 29b and determining the liquid level 20a in the float chamber.

The discharge tube 28 terminates adjacent to the bottom of the flushing chamber 40, the volume of which is substantially larger than the liquid volume (for instance about 3 ml) that can be accommodated in the float chamber 20 around the float 23. The flushing chamber is provided at the top with an air duct 41 with a vent pipe 42 which, like the air duct 29a, is carried to the upper surface of the housing 11. An outlet pipe 43 from the bottom of the flushing chamber 40 is provided with a valve 45 adapted to be opened by the manual control 44 and by means of an electromagnet 45a, FIG. 3.

On the upper surface of the housing is a displaceable top member 17 guided in slide rails 18 and supporting a vertical screw spindle 35, which by means of a head 36 can be screwed down against the filter plunger 34. The top member, moreover, has a lens 19 and a lamp L3 for the observation of the float movements, as will be explained later. The top member 17 can be displaced between three different positions a clear position in which the filter chamber is accessible for insertion and withdrawal of the filter housing, a pressure position in which the screw spindle is located over the centre of the plunger 34 in the fitted filter housing, and a reading position in which the lens 19 — after withdrawal of the filter housing — is located over the centre of the filter chamber and the float chamber, while the lamp L3 illuminates the acrylic plate 22 and the liquid surface at 20a.

The electric circuit of the apparatus is illustrated by the block diagram of FIG. 3.

A current supply unit 50 is connected to the main supply, 220 V a.c. and feeds the d.c. and a.c. voltages required in the electronic circuits. The heating lamps L1 and L2 are fed with a supply voltage of 220 V and, as mentioned above, it is controlled by the thermistor 51 via the bridge coupling 52, the amplifier 53 and the relay 54.

The two measuring coils S1 and S2 are connected to voltage stabilizers 55 and 56, which, as will be explained later, are controlled by means of a reference element 57, two adjustable resistors P1 and P3, and a linear potentiometer P4 provided with an adjustment member with digital recording, for instance with three digit positions.

Finally there is a time circuit 58 which controls a return coil SR (described later) and a second time circuit 59 which controls the electromagnet 45a for operation of the valve 45. These circuits are all conventional and therefore will not be described in greater detail.

If the apparatus described above is to be used for filtering and density determination of fat extracted by wet grinding in a solvent, an extraction solvent should be used that needs the following:

1. High density (to minimize the influence of variations in the density of the fat).
2. High fat-extracting properties — including good penetration in the particles and low viscosity.
3. Preferably capable of extracting the same substances as petrolether, which is used in the standard method.
4. Must not absorb water.
5. High boiling point (to eliminate inaccuracy caused by evaporation.
6. Low toxicity.
7. Must not have an unpleasant odour.
8. Must not be explosive or inflammable.
9. Must be cheap and readily available and have good stability.

It was found that the best extraction agent was apparantly tetrachloroethylene, which has a density of 1.62, i.e., substantially higher than the previously used compound, orthodichlorobenzine, which has a density of 1.31. Tetrachloroethylene is much used for dry cleaning and can be bought everywhere. If the technical quality can be used it is very cheap, but the density varies somewhat, and this should be taken into account (this question will be taken up again later). The liquid fulfils practically all the requirements of a good extraction liquid, except perhaps Item 5: High Boiling Point. The boiling point is 121° C, which is considerably higher than that of ether and petrolether, which are used in the standard method, but still so low that the extraction, filtering and density determination must be performed in closed vessels to eliminate uncontrollable evaporation and consequent inaccuracy.

The liquid extraction mixture is poured into the filter inserted in the filter chamber 30, the removable plunger 34 is fitted, the top member 17 pushed over the filter and the plunger 34 pressed down, while th screw spindle 35 is screwed home to a stop member which is not shown. Thus the air under the plunger is compressed and the filtering is performed under pressure in a closed system. The filtrate runs into the hopper 31 and from there through the apertures 22a into the float chamber 20. In the closed system evaporation is eliminated. It will be obvious that evaporation is very critical for the part of the liquid that accumulates under the filter disc, since the amount of filtrate required for filling the densimeter is but 10 ml or thereabout, whereas the amount of liquid poured from the grinding apparatus into the filter housing is 120 ml.

The liquid flows through the float chamber, flushing the chamber and the float for remnants of the preceding sample. Through the discharge pipe 28 of the float chamber the liquid flows downwards into the flushing chamber 40 where the valve 45 is closed. When the flushing chamber is filled with liquid the float chamber and the float will be cleansed of remnants from the preceding sample. The liquid now rises in the float member and is finally discharged through the overflow pipe 29. This in connection with the air duct 29a ensures a well defined liquid level in the float chamber. Further filtrate flows out through the overflow pipe, so that it is not necessary to suspend the filtering procedure when the float chamber has been filled. The large surface in the hopper 31 helps to rapidly bringing the filtrate to the temperature of the thermostat block.

The filter is now withdrawn from the filter chamber, the perforated plate 33 detached, the paper filter disc 37 removed and the plunger forced through the cylinder 32, which is thus cleansed inside.

Finally, the bottom of the plunger and the perforated plate are wiped with an absorbing cloth, and the filter assembly is ready for a new filtering process. The cleansing can be carried out in a few seconds on account of the smooth surfaces which are easily cleaned. The cleansing between the samples is important since otherwise fat might be transmitted from one sample to the next, and particularly where alternating samples have widely different fat percentages the cleansing plays a role.

At this stage the actual density determination takes place. The drawbacks of the normally used hydrometer have already been mentioned. The inventor has developed an electronic densimeter which in the first place eliminates the drawbacks of the hydrometer and secondly involves a series of advantages which will be explained below.

The density of the filtrate is to be determined with an accuracy of about $10^{-4}$, i.e. a tolerance of one on the fourth decimal of the density, which corresponds to about 0.05 percent of fat in the sample. As the temperature coefficient of the liquid is about $10^{-3}$, this means that the temperature of the filtrate is to be measured or controlled within about 0.1° C.

The temperature coefficient of the filtrate depends to some degree on the dissolved amount of fat and is therefore not constant over the whole of the measuring area. A thermostat has therefore been introduced to maintain a constant temperature in the liquid during the density determination. As the volume of liquid in the float chamber is only about 3 ml, the thermostat operation will be rapid. The temperature of the filtrate during determination is set at 37° C. This temperature has been selected on basis of the following considerations:

a. The temperature shall be somewhat above the maximum room temperature plus the rise of temperature caused by the effect developed in the electronic system of the apparatus — this to have a certain range of adjustment, since it would make the apparatus considerably more complex if a cooling thermostat were required.
b. The temperature must not be too high, since that might cause evaporation errors — even though the chamber is practically completely sealed.
c. The thermostat controlled temperature in the densimeter shall be as near the final temperature of the reactor as possible to obtain rapid thermostat operation.

This has been achieved by the construction of the block 10 described above, which may be named a "dry thermostat."

The advantages of the dry thermostat are the following:

a. No filling of thermostat liquid — or discharge thereof for transport of the apparatus.
b. No circulating pump required.
c. Low cost construction, in that the coils required for measuring the density can be wound in spiral grooves in the thermostat block, which thus acts as coil mould. In a liquid thermostat a separate float chamber would have to be provided for containing the filtrate – here in the dry thermostat this chamber is simply an axial channel in the block itself.

The density of the filtrate is measured by means of the float 23 which is entirely immersed in the liquid. The magnet 24 of the float is actuated by the magnetic field generated by the two coils wound in spiral grooves in the thermostat block, one at either side of the magnet. By changing the current in the coils the force applied to the float may be regulated so as to compensate for the varying buoyancy of the float which depends on the density of the liquid.

In magnetic densimeters a uniform magnetic field is often used for actuating the float, but this complicates the operation of the apparatus, because the float may move sideways and thus impinge upon the inner surface of the liquid container (like the hydrometer) and cause friction which will adversely affect the measurement. In the apparatus according to the invention a non-uniform magnetic field is used, whereby a relatively high field gradient is obtained and the float-magnet will constantly be urged towards the axis of the magnet field and thus tend to center the float in the chamber so that contact between the float and the chamber wall is avoided. It is necessary for the float to be able to move freely up and down in the liquid without friction. The higher the field gradient is, the larger will be the centering force applied to the magnet, but the more critical will also be the measuring arrangement in relation to the physical position of the float.

It is a great advantage that the float is completely immersed during the measuring operation so that the measurement – contrary to an ordinary hydrometer – is independent of the surface tension of the liquid.

The direction of the current through the two coils is such that the lower coil tends to pull the magnet down while the upper coil tends to pull the magnet upwards. Since the coils have the same number of windings and since the magnet, when the float is in contact with the chamber bottom, is exactly halfway between the coils, the forces applied to the magnet by the two coils will balance each other if the coils are fed with the same voltage. If, for instance, the voltage on the lower coil is reduced the resulting force on the magnet will be upward directed and the float will rise in the liquid. As the movement occurs in an increasing magnetic field the movement will be strongly accelerated. The float will rise rapidly through the liquid until the pointed top of the float breaks through the liquid surface at 20a and the float will contact the acrylic disc 22. When the filter container has been withdrawn from the filter chamber, the float can be readily observed through the acrylic disc as it breaks through the liquid surface, the disc being illuminated by the lamp L3, and the break through observed through the lens 19. A shade protects the eye from being hit directly by the light.

The two coils are fed with current from their respective voltage stabilizers. The voltage on the upper coil is maintained constant, for instance at 10 V, while the voltage on the lower coil may be varied by means of a linear potentiometer P4 from 10 V and down to for instance 4 V.

The float is balanced so that it will just float in pure tetrachloroethylene (the used extraction liquid) – this corresponds to fat percentage 0. When measuring a fat containing filtrate, the filtrate density will be lower than that of the pure tetrachloroethylene (the density of the fat being lower than that of the liquid). The float would therefore sink in the fatty filtrate if it were not stopped by the bottom of the float chamber, which is plane and smooth. The float is now heavier than the liquid and the voltage on the lower coil is reduced from 10 V until the upward force applied to the magnet from the coils is just sufficient to make the float rise through the liquid, which, as indicated above, happens almost instantly on account of the high field gradient. The potentiometer P4, which controls the variable voltage on the lower coil, is provided with a digital button on which the position of the potentiometer can be read. A higher fat percentage in the filtrate corresponds to a lower voltage on the lower coil. The turning of the button is stopped at the moment the float emerges from the liquid. The reading on the digital button is in a unique relation to the fat percentage of the examined sample.

The button, obviously, must be turned very slowly when the point of measurement is approaching – if it is turned too far it will have to be turned back and the float must be returned to the bottom position by pressing a "return button" that activates a pair of coils SR, FIG. 3, which are wound around the measuring coils, by a voltage causing a downward force to be applied to the magnet. On account of the turbulation caused in the liquid by the downward movement of the float it will be advisable to provide the "return voltage" with a suitable time constant so that the float is retained at the bottom for a brief moment, for instance one half second, until the liquid has subsided.

It has been mentioned above that the voltage on the lower coil is variable within a range of 10 –4 V. The reason why it is not variable down to 0 is that the resulting field gradient would be too low if only one coil is live and also the centripetal force applied to the float would be too small, with the result that the float might get into contact with the inner surface of the chamber. Another reason why the minimum voltage of the lower coil should not be 0 is the following:

To ensure contact between the float and the chamber bottom it is not desirable to have a too low field gradient. When the float sinks in response to the action of the return button it will cause movement in the liquid and there is also a slight resiliency in the base. Owing to these two factors the potentiometer button must be turned slightly back before the measuring position in order to ensure that the float abuts on the bottom before the next measuring operation. When the field gradient is high, the potentiometer need only be turned very little back before the next measurement, which facilitates the operation of the apparatus. A high field gradient ensures a stable start position of the float. A further advantage of the relatively high and approximately constant field gradient over the measuring area is that the rising of the float through the liquid is very fast.

Low field gradients or uniform magnetic fields, as often used in magnetic densimeters, result in slow and sluggish float movements so that the measuring operation takes a long time.

In the known magnetic densimeters the position of the float in the float chamber is determined either by a pair of sensing coils adjacent to the magnet or by transmitting light through a transparent float chamber. The position of the float may then be maintained constant by a servo mechanism and the magnetic field of the main coils controlled by the sensing coils or via a photocell controlled by a light beam through the chamber.

In the present apparatus it would be too complicated to use servo control and sensing coil. To obtain the desired accuracy of measurement the float must be located with a precision of approximately 1-2 hundredth of a mm, which is a complex matter and would cause an unacceptable increase of the costs.

The system suggested here, in which the float is viewed from above when the cusp breaks the liquid surface, has been chosen for the following reasons:

a. In the conventional method where light is transmitted through the chamber the chamber wall must be of glass, which has a low heat conductivity so that the thermostat effect on the liquid will be correspondingly slow.

b. The apparatus according to the invention may be used also with non-transparent liquids such as milk.

c. The breaking through the liquid surface of the float can be seen very clearly through an ordinary magnifying glass and the normally used microscope can be dispensed with.

The coils, as already mentioned, are flat coils. The reasons for this are the following:

a. If the coils were high the field gradient would be so high that the float position at the bottom would be critical (affected for instance by a small solid particle under the float bottom). If a lower field gradient is desired the coils should be removed further from the magnet, which in turn would require a higher coil effect with the consequent deleterious effect to the thermostat action.

b. The flat coils will readily give off current heat losses to the surrounding aluminium block and the retroactive effect on the thermostat action will therefore be negligible. The flat coils have the further advantage that owing to the large surface they provide good contact with the thermostat block so that the inner heating of the coil wire will not be too great and affect the resistance in the wire, which would tend to change the current and thus also the magnetic field of the coils. The fact is that the coils are fed with a constant voltage, not a constant current, the former resulting in a simpler electronic device in the apparatus.

The two-coil system used here, where the coils pull the magnet in opposite directions, has several advantages:

a. The two voltage stabilizers 55 and 56 are controlled from the same reference element 57. A change of voltage here will have the same effect on both magnetic fields at 0 and therefore not affect the O-position. In conventional densimeters the demands with respect to voltage adjustment are very great, where the accuracy of measurement is $10^{-4}$, for instance, the accuracy of adjustment must be $\frac{1}{2} \times 10^{-4}$, whereas the demands with respect to voltage adjusters in the present apparatus are much smaller. At 0, that is when the float chamber contains pure extraction liquid, the measurement is independent of the voltage on the coils. At the other end of the measuring range, if the instability of the voltage stabilizer is X percent relative, the influence on the density measurement will be x.10/6 percent relative when the voltage in the lower coil is changed from 10 to 4 V while the upper coil is maintained at 10 V. A relative accuracy of for instance one-half percent is required, so that the accuracy required of the stabilizer will be only 0.3 × $10^{-2}$, i.e. 2 units less that in the conventional apparatus.

b. In most of the conventional magnetic densimeters each apparatus must be calibrated individually, i.a. because of differences in the floats. It is impossible to produce a glass body of a volume which is uniform within a limit of for instance $10^{-4}$.

According to the principle applied here the voltage on the upper coil is adjusted to 0 (with extraction liquid without fat), while the other end of the scale by means of extraction liquid admixed with a known amount of oil is adjusted by changing the variation range of the voltage on the lower coil. The relation between digital output on the potentiometer button and the change of density is linear. Thus a straight line is fixed in two extreme points and the calibration is practically independent of the weight and volume of the float, variations of ±20–30 percent of the float weight or volume being without significance. This reduces the costs of the apparatus substantially, partly because a simpler float can be used, partly because of less calibration work.

The voltage stabilizer 55 actuates the lower coil 31, the voltage of which is controlled by the potentiometer P4. The voltage stabilizer 56 actuates the upper coil S2 which is adjusted to constant voltage. First, the apparatus is adjusted to correct reading for high fat percentage by setting the trimming resistor P1 (whereby the variation range of the lower coil voltage is changed). Then it is adjusted to 0 for 0 percent of fat, i.e., with pure extraction liquid, by setting the trimming potentiometer, whereby the voltage on the upper coil is varied. When this has been made, the apparatus is adjusted. The setting of P1 (for high fat percentage) does not influence the 0 position because the slide switch in the digital potentiometer P4 in 0 position is disposed directly on the potential from the reference element 57. The result is that the two points of adjustment can be set independently of one another, which simplifies the adjustment so much that the user of the apparatus can easily make the calibration in the two points without possessing special skill.

Thus the measurements of the apparatus can be made independent of the density of the extraction liquid. And it has been found that the mineral oil, of the type "Esso Coray," can be obtained with an accurate and constant density corresponding to the average value of the density of the various vegetable oils. This mineral oil is 100 percent stable (contrary to vegetable oils); it does not change for years and can therefore be used as a sort of "world standard" for fat percentage readings on the apparatus. A certain amount of Coray oil is weighed out, corresponding for instance to 60 percent fat (the upper end of the scale), and admixed with 120 ml of tetrachloroethylene. As the standard weight of the sample is 45 grams, the 60 percent of fat corresponds to an amount of Coray oil of 27 grams, which is admixed with the normally used 120 ml of extraction liquid. The apparatus is then adjusted to show the correct reading at 0 percent of fat with only extraction liquid in the float chamber and at 60 percent fat in the Coray oil mixture. The apparatus will then always show the correct reading all over the scale as long as the same extraction liquid is used. If changing over to another extraction liquid (tetrachloroethylene of a different density) a new adjustment must be made. In this system the measurements will be independent of the density of the extraction liquid and a technical quality of tetrachloroethylene can be used, so that the costs of chemicals will be quite low. In case of minor variations in the density of the extraction liquid it will be sufficient to adjust at 0 (i.e. to 0 percent of fat) and thus the Coray oil will not be needed, but if the density of the tetrachloroethylene differs greatly from that of the pure liquid, adjustment must be made also at 60 percent of fat on the scale. In any case it is a great advantage to have a good control at the upper end of the fat scale by means of the Coray oil.

After completion of the measurement the valve 45 is opened to empty the float chamber and the flushing chamber of liquid.

The flushing chamber is connected at the top to the air duct 41, which contributes to the filling of the chamber with liquid. When the apparatus is emptied a small amount of liquid will be left at the opening of the air duct into the flushing chamber as a result of the surface tension. This small amount of liquid prevents an effectice filling of the flushing chamber in the next operation because it blocks the air outlet. To overcome this problem the outlet from the float has been provided with a thin vertical tube 28 leading almost to the bottom of the flushing chamber. This creates a suction effect whereby the inimical drop of liquid in the air duct is sucked out on the emptying of the system.

The bottom plug 25 of the float chamber can easily be removed for cleansing the float chamber and the float, but this will normally be necessary only if the filter paper should burst and particles of the material enter the filtrate. The float may also be withdrawn from the top of the float chamber with a pair of pincers after removal of the acrylic disc.

Summary of the Theory of Fat Determination by the Density Method.

Symbols:
Weight of material (test sample) $= V$
Fat percentage $= f$
Fat density $= df$
Volume of extraction liquid $= R$
Density of extraction liquid $= dv$
Density of mixed fat and extraction liquid $= d$ After completion of extraction and filtering (in theory the entire amount of liquid is filtered) we have:

Weight of fat $= V \times f : 100$; Volume of fat $= V \times f : (100 \times df)$ Weight of liquid $= R \times dv$; Volume of liquid $= R$ Density of mixture $=$ Weight $:$ Volume $= d = (V \times f : 100 + R \times dv) : [(R + V \times f : (100 \times df))]$.

As the densimeter has been set at 0 for the extraction liquid, we measure the difference between $dv$ and $d$:

Density difference $(dv - d) = V \times f \times (dv - df)/R \times 100 \times df + V \times f$ The density difference $dv - d$ is proportional to the digital output on the densimeter, and the above formula therefore indicates the relation between the fat percentage of the sample and the reading. By inserting the known values of the constituent constants the density difference of the various fat percentages may be calcutaled.

The apparatus was controlled with known mixtures of tetrachloroethylene and Coray oil. The density of the Coray oil df was inserted in the above formula, and the theoretically calculated values were found to agree satisfactorily with the values measured on the densimeter. A corresponding control was carried out with soybeans. A series of samples with different fat percentage were analysed by the standard method. The density df of the soya oil was inserted in the formula together with the other known constants, and here too it was found that the measured values tallied quite well with the theoretical calculations.

The satisfactory agreement between the calculated values and the practically ascertained measurements substantiates the justification of applying the above formula.

The formula shows that it should be possible to use the same scale for all materials, leaving out the small variations in the density of the fat. The formula also shows that the same fat percentage conversion table can be used with all apparatus, provided that correct adjustment to 0 percent of fat with a known mixture of Coray oil and tetrachloroethylene is made, and when the adjustment is carried out as outlined above the density of the liquid will be of no significance.

The influence of the fat density ($df$) is found by partial differentiation with respect to f and df:

$\Delta f/f \times 100 \% = V \times f : R + 100 \times dv/df (dv - df) \times \Delta df$, (intermediate calculations have been left out), or by inserting the known constants and leaving out immaterial terms:

$\Delta f/f \times 100 \% = 269 \times \Delta df$. This holds good where $f = 30\%$, that is in the middle of the measuring range, but the ends of the range do not show any great differences.

The above formula shows the relative error in fat percentage caused by a change of fat density of $\Delta df$.

If inserting for instance soybeans $\Delta df = \pm 2 \times 10^{-3}$ (the variation in soybean oil density), we get a relative error in the fat percent measurement of only $\pm 0.5$ percent, which is excellent as compared with the accuracy of the standard method which is only about 1 percent relative. In like manner the variation range for the density of other oils may be inserted in the formula, and it has been found that the errors introduced in the measurements of one and the same material will be quite negligible.

On the other hand relatively great changes may occur in the fat density when proceeding to another material for instance rapeseed oil: density range 0.906 – 0.910, and soybean oil: density range 0.917 – 0.921.

To compensate for these variations correction is made on the weight of the sample. The standard sample weight is 45 grams, for instance for soybean oil and Coray oil, which is used in the adjustment. The density of these materials is approximately in the middle of the variation range for all fats.

If measuring rapeseed oil in the apparatus the weight that gives the correct results may be calculated by means of the above mentioned formulae (or found by tests). For rapeseed oil the amount will be found to be 43.5 grams. In the same way the correct weight may be found for the other materials. The above example with rapeseed oil and soybean oil represents an extreme point; normally the fat densities will not vary much. Mixtures of fats, such as found in normal mixed feeds, can be measured with a reasonable accuracy on the same scale and using the same weight.

It is a great advantage to be able to use the same scale for all materials and in all apparatus. Calibration is limited to the determination of the required weight of the sample, and this requires very few analyses.

Also over a relatively large measuring range a satisfactory compensation for the density of the different fats may be obtained by using a sample of suitable weight and the same standard scale. This will be readily seen from the following example: In the range of 20–40 percent of fat (normally the variations in the same substance is considerably smaller) calculations are made at density variation 0.91 and 0.92 in the fat (this is an abnormally great variation). In the middle of the range (at 30 percent of fat) the correct weight of material is calculated in each case and from these weights the fat percentages are calculated at the ends of the range, i.e., at 20 and at 40 percent fat). At 20 percent it is found to be 20.05 percent and at 40 percent it is 40.1 percent. The error is only 0.25 relative and thus without significance.

What we claim is:

1. An apparatus for filtering and density determination of a liquid, particularly of fat extracted by wet grinding in a solvent, and of the type having a magnetically actuated float movable within a chamber, comprising a float chamber and a filter chamber connected thereabove and enclosed in a substantially massive non-magnetic metal body or metal block provided with thermostatic heat radiation control, said filter chamber having a perforated bottom plate for supporting filter means and a freely movable tightly fitting plunger, the float disposed within the float chamber consisting of a hollow glass body containing in its bottom portion a permanent magnet and terminating at the top in an upwardly directed cusp, said float being adapted to balance when placed in pure solvent and to sink in the filtrate, two coils adapted for cooperation with the magnet in the float being positioned in recesses in the metal block, said coils being of low height relatively to their width and being so connected to a d.c. supply that the magnet fields generated by the coils will tend to actuate the float magnet in opposite directions, said coils being connected to respective means for adjusting the voltages fed to the coils to vary the corresponding magnetic fields until the float is balanced to provide a density determination.

2. An apparatus according to claim 1 characterized by at least one reset coil (SR) which on being energized will exert a downwardly directed force against the float magnet (24).

3. An apparatus according to claim 2, characterized in that the said reset coil or coils (SR) are connected in a circuit (58) which on being manually activated will cause magnetization for a predetermined period of time.

4. An apparatus according to claim 1 characterized by a cylindrical filter chamber (30) formed in the metal block (10) and having a slightly conical bottom (31) and a filter cylinder (32) adapted to be inserted in the filter chamber and having at the bottom a perforated plate (33) for supporting a filter disc (37) the edge of which is fitted into a recess (38).

5. An apparatus according to claim 4, characterized in that the filter cylinder (32) is provided at the top with a freely movable tightly fitting plunger (34).

6. An apparatus according to claim 1 characterized in that the float chamber is formed as a vertical cylindrical bore (20) in the metal block (10), covered at the top with a transparent cover (22) provided with throughgoing holes and below the cover connected to an overflow pipe (29) provided with an air duct (29a), and that the chamber (20) at the bottom has a plane abutment face (26) which supports the float (23) at such a level that its magnet (24) will be located substantially in a plane between and equally spaced from the coils (S1 and S2) and at least one outlet (27) opening under the said face.

7. An apparatus according to claim 6, characterized in that below the float chamber (20) is formed a flushing chamber (40) communicating through a narrow channel (28) with the outlet (27) of the float chamber and further provided with a scavenging pipe (41, 42) and a discharge pipe (43) provided with a valve (45).

8. An apparatus according to claim 7, characterized in that the outlet channel (28) from the float chamber (20) is carried down to the bottom of the flushing chamber (40).

9. An apparatus according to claim 7, characterized in that the valve (45) in the outlet (43) from the flushing chamber (40) is a magnet operated valve connected to be controlled by a switch actuated by the top member (17) and a timing circuit (59) so that the valve is opened and kept open for a predetermined period of time when the top member is carried to the clear position.

10. An apparatus according to claim 1 characterized in that the metal block (10) is provided with a temperature sensor (51) which in a manner know per se controls electrical heating elements for heating the metal block (10).

11. An apparatus according to claim 10, characterized in that the heating elements are heat radiation elements such as lamps (L1 and L2) mounted for external radiation of the block (10).

12. An apparatus according to claim 1 characterized by a top member (17) displaceably mounted on the upper surface of the apparatus and provided with a screw spindle (35) for cooperation with the filter piston (34) and with a lens (19) and a lamp (L3) for inspection of the surface (20a) of the liquid in the float chamber (20), the said top member being displaceable between three positions, namely a clear position in which the filter chamber (30) is accessible, a presure position in which the screw spindle (35) is coaxial with the filter chamber, and a reading position in which the lens is coaxial with the filter chamber.

* * * * *